(12) United States Patent
Sasaki et al.

(10) Patent No.: US 10,777,909 B2
(45) Date of Patent: Sep. 15, 2020

(54) LOOP ANTENNA ARRAY AND LOOP ANTENNA ARRAY GROUP

(71) Applicant: Nippon Telegraph and Telephone Corporation, Tokyo (JP)

(72) Inventors: Ai-ichiro Sasaki, Atsugi (JP); Fumiharu Morisawa, Atsugi (JP); Hiroki Morimura, Atsugi (JP); Tsutomu Mizota, Atsugi (JP); Osamu Kagami, Atsugi (JP)

(73) Assignee: Nippon Telegrah and Telephone Corporation (JP)

( * ) Notice: Subject to any disclaimer, the term of this patent is extended or adjusted under 35 U.S.C. 154(b) by 0 days.

(21) Appl. No.: 15/742,650

(22) PCT Filed: Aug. 4, 2016

(86) PCT No.: PCT/JP2016/072943
§ 371 (c)(1),
(2) Date: Jan. 8, 2018

(87) PCT Pub. No.: WO2017/030001
PCT Pub. Date: Feb. 23, 2017

(65) Prior Publication Data
US 2018/0205157 A1 Jul. 19, 2018

(30) Foreign Application Priority Data

Aug. 17, 2015 (JP) ................................. 2015-160394

(51) Int. Cl.
*H01Q 21/08* (2006.01)
*H01Q 7/00* (2006.01)
(Continued)

(52) U.S. Cl.
CPC ............... *H01Q 21/08* (2013.01); *H01Q 7/00* (2013.01); *H01Q 21/06* (2013.01); *H01Q 21/24* (2013.01);
(Continued)

(58) Field of Classification Search
CPC ........ H01Q 21/08; H01Q 1/3291; H01Q 7/00; H01Q 7/04; H01Q 1/22; H01Q 21/26;
(Continued)

(56) References Cited

U.S. PATENT DOCUMENTS 4,506,267 A * 3/1985 Harmuth .................. H01Q 7/00
343/744
4,751,516 A 6/1988 Lichtblau
(Continued)

FOREIGN PATENT DOCUMENTS

CN 1826537 A 8/2006
CN 102132362 A 7/2011
(Continued)

OTHER PUBLICATIONS

Shi et al. Electrically Large Zero-Phase-Shift Line Grid-Array UHF Near-Field RFID Reader Antenna, IEEE Transactions on Antennas and Propagation, vol. 62, No. 4, Apr. 2014. (Year: 2014).*
(Continued)

*Primary Examiner* — Ricardo I Magallanes
(74) *Attorney, Agent, or Firm* — Kilpatrick Townsend & Stockton LLP

(57) ABSTRACT

Provided is a loop antenna array that can easily create a magnetic field distribution which enables the boundary of a communication area to be clearly set. $2^n$ loop antennae are provided adjacently to one another, where n is a natural number. The directions of currents in adjacent ones of the loop antennae are opposite to each other. For example, in a loop antenna array, two loop antennae are disposed adja-
(Continued)

cently to each other on an insulator substrate. First feed points energize one loop antenna and second feed points energize the other loop antenna.

16 Claims, 8 Drawing Sheets

(51) Int. Cl.
  *H01Q 21/06* (2006.01)
  *H01Q 21/24* (2006.01)
  *H01Q 21/29* (2006.01)
  *H04B 5/00* (2006.01)
  *H01Q 9/28* (2006.01)

(52) U.S. Cl.
  CPC .......... *H01Q 21/29* (2013.01); *H04B 5/0087* (2013.01); *H01Q 9/28* (2013.01)

(58) Field of Classification Search
  CPC ..... H01Q 21/24; H02J 50/20; G06K 7/10336; H04B 5/0087
  USPC ................................. 343/855, 702, 742, 867
  See application file for complete search history.

(56) References Cited

U.S. PATENT DOCUMENTS

| | | | |
|---|---|---|---|
| 6,298,271 B1 | 10/2001 | Weijand | |
| 6,388,628 B1 | 5/2002 | Dettloff et al. | |
| 7,579,994 B2 | 8/2009 | Bacquet et al. | |
| 2004/0183742 A1 | 9/2004 | Goff et al. | |
| 2004/0196205 A1 | 10/2004 | Shishido et al. | |
| 2008/0191955 A1* | 8/2008 | Manholm | H01Q 21/26 343/797 |
| 2010/0001914 A1* | 1/2010 | Lavedas | H01Q 1/2216 343/742 |
| 2014/0176274 A1* | 6/2014 | Chiang | H01F 38/14 336/170 |
| 2015/0009088 A1* | 1/2015 | Lavedas | H01Q 7/00 343/867 |
| 2015/0155737 A1 | 6/2015 | Mayo | |

FOREIGN PATENT DOCUMENTS

| | | |
|---|---|---|
| EP | 1128464 A1 | 8/2001 |
| EP | 2276107 A2 | 1/2011 |
| JP | H03-500699 A | 2/1991 |
| JP | 04-248704 A | 9/1992 |
| JP | 2000-32916 A | 11/2000 |
| JP | 2003-142927 A | 5/2003 |
| JP | 2004-328722 A | 11/2004 |
| JP | 2007-174570 A | 7/2007 |
| JP | 2013-125998 A | 6/2013 |
| JP | 2013-233117 A | 10/2013 |
| JP | 2015-008383 A | 1/2015 |
| WO | 1998/005088 A1 | 2/1998 |
| WO | 2001/005467 A1 | 1/2001 |
| WO | 2005/081808 A1 | 9/2005 |
| WO | 2009/101750 A1 | 8/2009 |
| WO | 2010/002821 A1 | 1/2010 |

OTHER PUBLICATIONS

International Preliminary Report on Patentability, PCT Application No. PCT/JP2016/072943, dated Mar. 1, 2018

Supplementary European Search Report, European Patent Application No. 16836992.4, dated Feb. 25, 2019.

Office Action, Korean Patent Application No. 10-2017-7036947, dated Nov. 7, 2018.

International Search Report, PCT Application No. PCT/JP2016/072943, dated Oct. 4, 2016.

Office Action, Japanese Patent Application No. 2015-160394, dated Jul. 19, 2016.

Office Action, Japanese Patent Application No. 2015-160394, dated Nov. 22, 2016,.

Decision of Refusal, Japanese Patent Application No. 2015-160394, dated Apr. 4, 2017.

Report of Reconsideration by Examiner before Appeal, Japanese Patent Application No. 2015-160394, dated Jul. 19, 2017.

Office Action, Japanese Patent Application No. 2015-160394, dated May 8, 2018.

Office Action, Korean Patent Application No. 10-2017-7036947, dated May 27, 2019, 5 pages.

Office Action, Chinese Patent Application No. 201680048450.5, dated Jun. 4, 2019, 15 pages.

Office Action, European Patent Application No. 16 836 992.4 dated Aug. 8, 2019, 6 pages.

Office Action, European Patent Application No. 16 836 992.4 dated Dec. 19, 2019, 6 pages.

Office Action, Chinese Patent Application No. 201680048450.5, dated Feb. 25. 2020, 25 pages.

* cited by examiner

LOOP ANTENNA ARRAY AND LOOP ANTENNA ARRAY GROUP

TECHNICAL FIELD

The present invention relates to a loop antenna array capable of clearly setting the boundary of a communication area.

BACKGROUND ART

In recent years, there has been an increasing need for wireless communication in which the communication area is purposely limited (area limited wireless communication). For example, an electric field communication system disclosed in Patent Document 1 is one means for implementing the area limited wireless communication.

Meanwhile, low-frequency (approximately 10 MHz) magnetic fields have such a characteristic that they interact with human bodies and surrounding environments significantly less than electric fields do. For example, a loop antenna disclosed in Patent Document 2 generates a magnetic field in a limited space.

PRIOR ART DOCUMENT

Patent Document

PATENT DOCUMENT 1: Japanese Patent Application Publication No. 2007-174570
PATENT DOCUMENT 2: Japanese Patent Application Publication No. 2013-223117

SUMMARY OF THE INVENTION

Problem to be Solved by the Invention

In electric field communication, only terminal devices present in an area near an access point device installed in an environment can communicate with the access point device. However, the electric field distribution near the access point device is greatly dependent on the installation environment, the user's posture, and so on, thus making it difficult to establish a definite nearby area with electric fields. For this reason, there may be a case where a terminal device present at a position where it should be able to perform communication cannot perform communication, the opposite case, and other similar cases. It is therefore difficult to build a stable and reliable area limited wireless communication system.

In view of this, one may consider using a low-frequency magnetic field as a communication medium, as disclosed in Patent Document 2. A reliable area limited wireless communication system can be built if it is possible to create such a magnetic field portion that the intensity of the magnetic field abruptly attenuates at the boundary of the communication area.

However, in the case of the antenna disclosed in Patent Document 2, which includes an array of concentrically disposed loops, there is major interaction between the loops. Hence, it is difficult to accurately cause an intended amount of current to flow in each loop antenna that constitutes the array. This leads to a problem that it is difficult to create such a magnetic field portion that the intensity of the magnetic field abruptly attenuates at the boundary of the communication area.

The present invention has been made in view of this problem, and an objective thereof is to provide a loop antenna array that can easily create a magnetic field distribution which enables the boundary of a communication area to be clearly set.

Means for Solving the Problem

A loop antenna array of the present invention is summarized as a loop antenna array including $2^n$ loop antennae adjacent to one another, where n is a natural number, in which directions of currents in adjacent ones of the loop antennae are opposite to each other.

Effect of the Invention

According to the loop antenna array of the present invention, it is possible to provide a loop antenna array that can easily create a magnetic field distribution which enables the boundary of a communication area to be clearly set.

MODES FOR CARRYING OUT THE INVENTION

Figure 1:
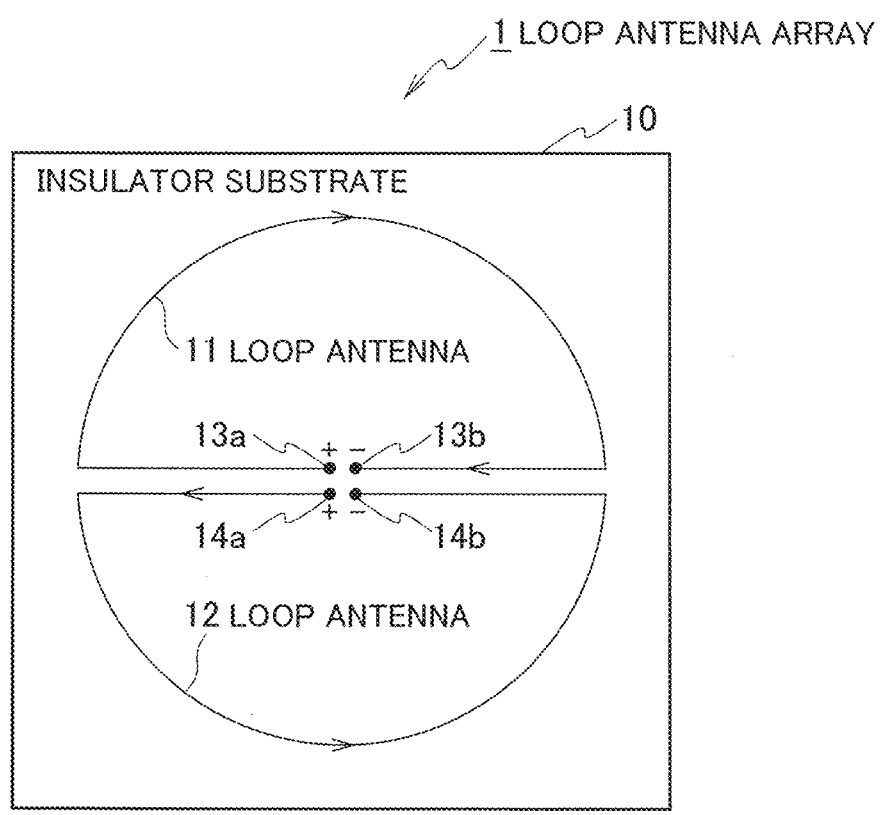
FIG. 1 is a diagram illustrating an exemplary configuration of a loop antenna array 1 in a first embodiment.

Embodiments of the present invention will now be described using the drawings. Identical elements in a plurality of drawings will be denoted by the same reference numeral, and description will not be repeated.

First Embodiment

FIG. 1 illustrates an exemplary configuration of a loop antenna array 1 in a first embodiment. The loop antenna array 1 in this embodiment includes an insulator substrate 10, a loop antenna 11, a loop antenna 12, first feed points 13a, 13b, and second feed points 14a, 14b. In the loop antenna array 1, the two loop antennae, the loop antennae 11, 12, are disposed adjacently to each other on the insulator substrate 10.

The first feed points 13a, 13b energize the loop antenna 11, while the second feed points 14a, 14b energize the loop antenna 12. The first feed point 13a and the second feed point 14a are positive electrodes (+), while the first feed point 13b and the second feed point 14b are negative electrodes (−).

The insulator substrate 10 is a substrate of a non-magnetic and non-conductive insulator and is, for example, a substrate of a material such as acrylic, Teflon, or ceramic. Although the shape of the insulator substrate 10 is illustrated as a square shape in this example, the shape of the substrate may be any shape.

Each of the shapes of the loop antennae 11, 12 in this example is, for instance, a semicircular shape. The conductor pattern that forms the loop antenna 11 is extended toward an outer edge of the insulator substrate 10 from the first feed point 13a (+), which is disposed near the center of the insulator substrate 10, to thereby form one base portion of the semicircular shape. The conductor pattern is further extended in a semicircle from a position near the outer edge to a position near the opposite outer edge of the insulator substrate 10. The conductor pattern is further extended toward the first feed point 13b (−), which is disposed near the center of the insulator substrate 10, in such a way as to form the opposite base portion of the semicircular shape, thereby forming the loop antenna 11.

Assuming that the plane on the insulator substrate 10 is an xy plane with its origin set at the center of the substrate, the loop antenna 12 is formed at the position axially symmetric to the loop antenna 11 with respect to the x axis of the insulator substrate 10. The loop antenna 12 is a loop antenna energized by the second feed points 14a, 14b, which are also disposed at the positions axially symmetric to the first feed points 13a, 13b, and having the same shape as the loop antenna 11 but bulging in the −y direction.

The first feed points 13a, 13b and the second feed points 14a, 14b apply equal AC currents to the two loop antennae 11 and 12. The first feed points 13a, 13b and the second feed points 14a, 14b may share a single signal source that energizes them. Alternatively, two signal sources may be prepared. However, the phases of the AC currents to be applied to the loop antennae 11, 12 need to be synchronized with each other.

Generally, the amplitude of a magnetic field generated at a distance by a current loop is proportional to the magnitude of its magnetic dipole moment vector m. The magnetic dipole moment vector m is calculated from the following formula.

[Math. 1]

$$m = IS \tag{1}$$

I is current flowing in the conductor loop (loop antenna). S is the area vector of the region surrounded by the loop antenna. The direction of m is the direction of a right-hand screw with respect to the direction of the current.

When equal currents are caused to flow in the two loop antennae disposed adjacently to each other on the same substrate (insulator substrate 10), the directions of the respective magnetic dipole moment vectors m are opposite to each other. This is because the direction of the current flowing in the loop antenna 11 is clockwise whereas the direction of the current flowing in the loop antenna 12 is counterclockwise.

Consequently, the sum of the magnetic dipole moment vectors m of the two loop antennae 11 and 12 is zero. In other words, the distant magnetic fields exhibit an abruptly attenuating characteristic. Thus, the loop antenna array formed as described above can create a sharp magnetic field distribution that cannot be obtained with a single loop antenna. A specific magnetic field distribution will be described later.

Figure 2A:
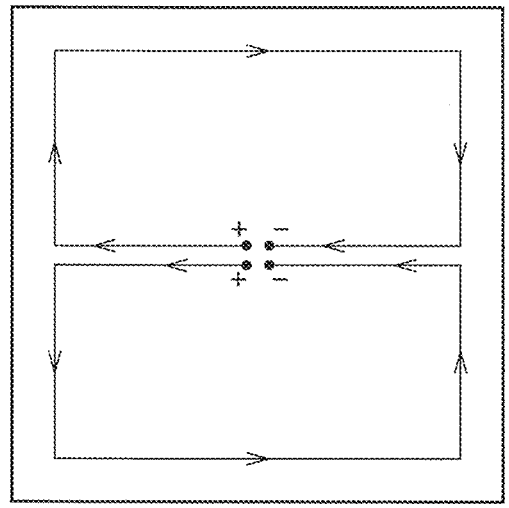
FIGS. 2(a) and 2(b), collectively referred to herein as FIG. 2 are a set of diagrams illustrating modifications of the loop antenna array 1.
Figure 2B:
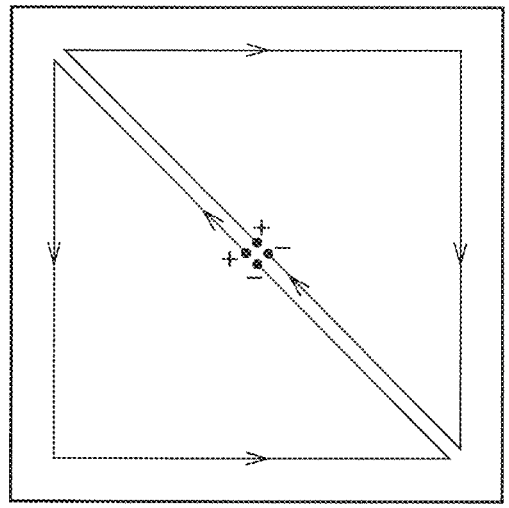

FIG. 2 illustrates modifications of the loop antenna array 1. FIG. 2(a) illustrates an example where the loop antennae 11, 12 are formed in the shape of a rectangle. FIG. 2(b) illustrates an example where the loop antennae 11, 12 are formed in the shape of an isosceles triangle.

The shape of each loop antenna is not limited to the above examples. The shape of each loop antenna may be different from one loop antenna array to another as long as the area of the region formed by each conductor loop constituting the loop antenna array is equal.

Figure 3A:
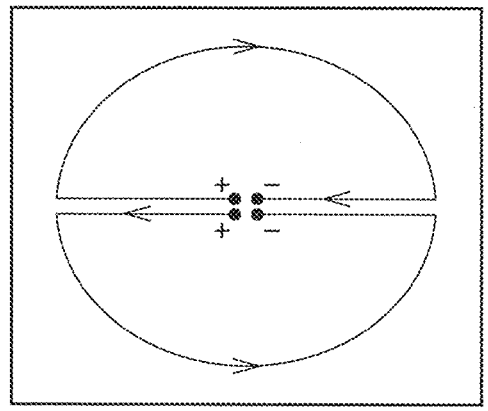
FIGS. 3(a), 3(b) and 3(c), collectively referred to herein as FIG. 3 are a set of diagrams illustrating examples where the aspect ratio of the loop antenna array 1 is changed.
Figure 3B:
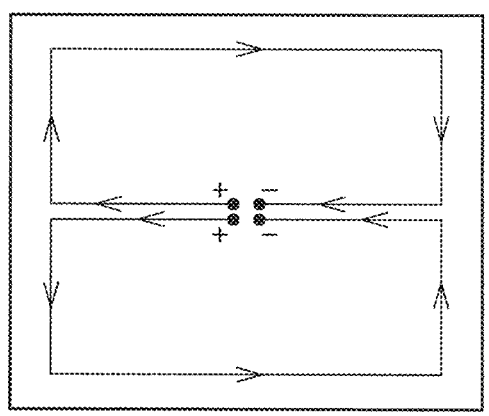
Figure 3C:
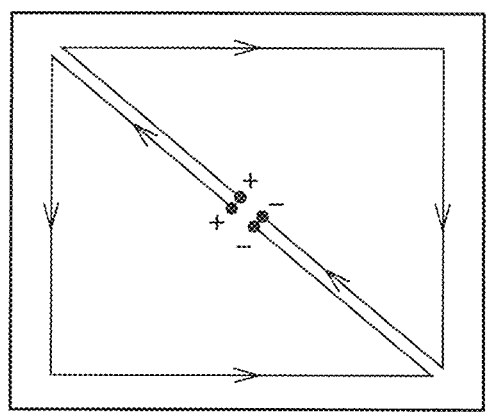

Also, the aspect ratio of the insulator substrate 10 does not need to be 1. As illustrated in FIG. 3, the shape of the insulator substrate 10 may be a rectangular shape. In other words, the shape of each loop antenna may be shortened in the y-axis direction of the insulator substrate 10 and stretched in the x-axis direction.

As described above, according to the loop antenna array 1, the two loop antennae are not disposed concentrically, as is done in conventional techniques, and there is therefore no interaction therebetween. Thus, an intended amount of current can be accurately caused to flow in the loop antennae 11, 12. This makes it possible to implement a loop antenna array having a sharp magnetic field distribution which enables the boundary of a communication area to be clearly defined as designed.

Second Embodiment

Figure 4:
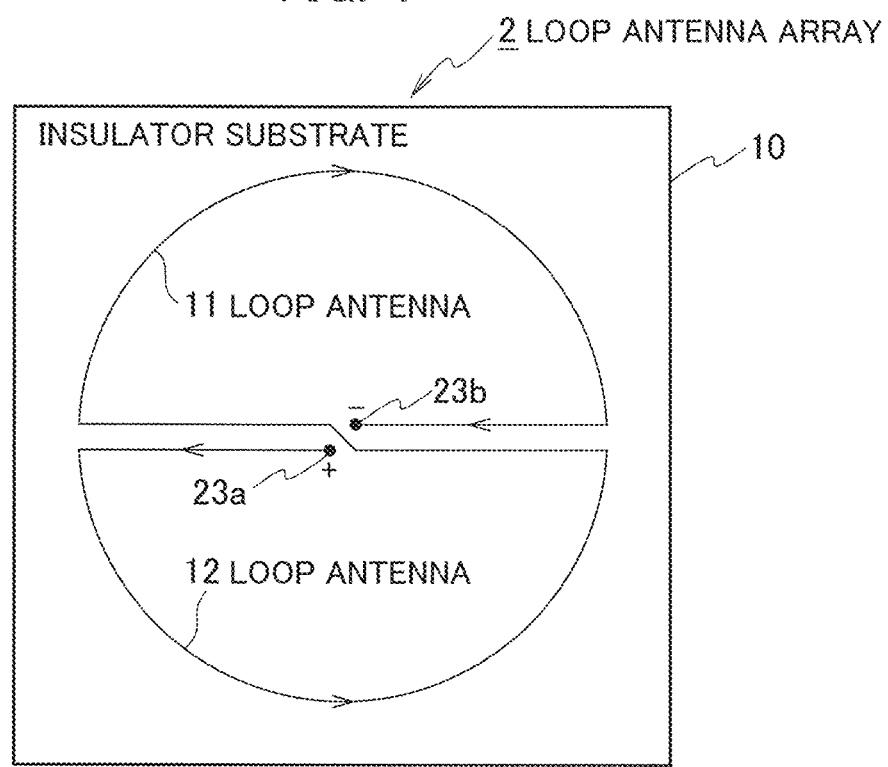
FIG. 4 is a diagram illustrating an exemplary configuration of a loop antenna array 2 in a second embodiment.

FIG. 4 illustrates an exemplary configuration of a loop antenna array 2 in a second embodiment. The loop antenna array 2 in this embodiment is one obtained by reducing the number of feed points in the loop antenna array 1.

The loop antenna array 2 includes a pair of feed points 23a, 23b. The pair of feed points 23a, 23b energize loop antennae 11, 12. The feed point 23a, which is a positive electrode (+), is disposed at the position of the above-described second feed point 14a. The feed point 23b, which is a negative electrode (−), is disposed at the position of the above-described first feed point 13b. In other words, the feed point 23a and the feed point 23b are disposed at point-symmetric positions about the origin.

One end of a base of the semicircular shape of the loop antenna 12, which is disposed toward the −y direction of the xy plane on an insulator substrate 10, by the center of the substrate is connected to the feed point 23a. The end of the opposite base of the semicircular shape of the loop antenna 12 by the center of the substrate is extended through the gap between the feed points 23a and 23b and connected to a portion of one base of the semicircular shape of the loop antenna 11 by the center of the substrate.

Further, the end of the opposite base of the semicircular shape of the loop antenna 11 is connected to the feed point 23b. The number of feed points can be reduced by forming the loop antennae 11, 12 in what is called a traversable manner which, for example, starts from the feed point 23a and ends at the feed point 23b, as described above. Note that the magnetic field distribution of the loop antenna array 2, which has fewer feed points, is the same as that of the above-described loop antenna array 1.

Third Embodiment

Figure 5:
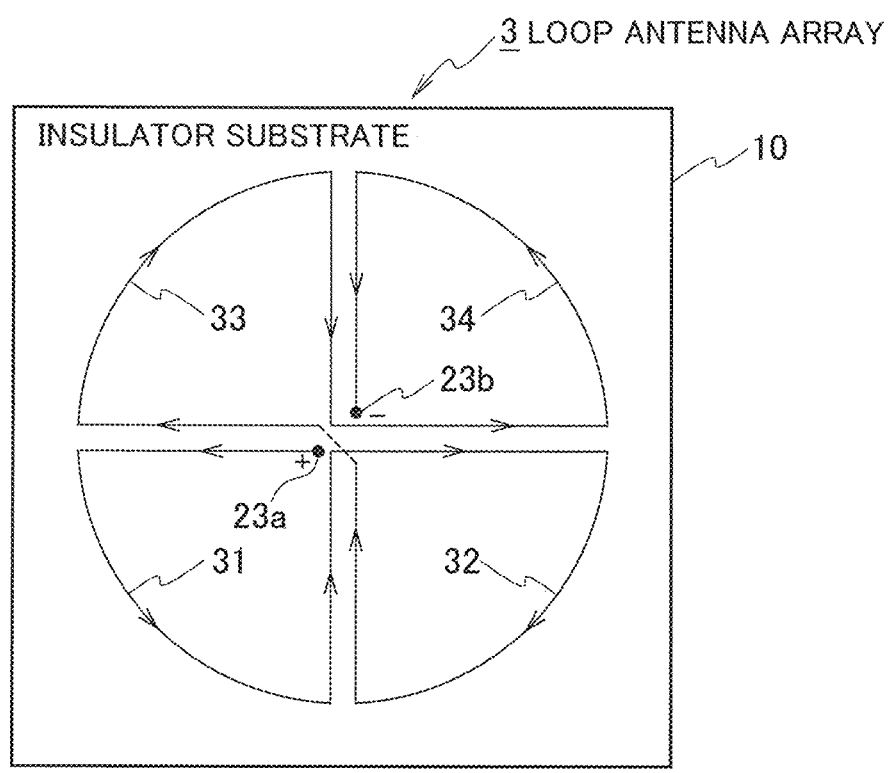
FIG. 5 is a diagram illustrating an exemplary configuration of a loop antenna array 3 in a third embodiment.

FIG. 5 illustrates an exemplary configuration of a loop antenna array 3 in a third embodiment. In the loop antenna array 3 in this embodiment, four loop antennae 31, 32, 33, 34 are disposed on an insulator substrate 10. Note that the feed points 23a, 23b are the same as the feed points in the above-described loop antenna array 2, as is obvious from their reference numerals. The feed point 23a is disposed near the origin of the third quadrant of the xy coordinate system with its origin set at the center of the plane on the insulator substrate 10, while the feed point 23b is disposed near the origin of the first quadrant.

The shape of each loop antennae 31, 32, 33, 34 is a quarter-circle fan shape. The feed point 23a energizes the start point of one radial portion of the fan shape of the loop antenna 31, disposed in the third quadrant.

The conductor pattern extended in the −x direction from the feed point 23a forms the one radial portion of the fan shape and then forms the arc portion and the opposite radial portion to thereby form the loop antenna 31 in the third quadrant. The conductor pattern is further extended in the +x direction to form one radial portion of the fan shape of the loop antenna 32, disposed in the fourth quadrant, and then its arc portion and opposite radial portion.

Moreover, the terminal of the opposite radial portion of the loop antenna 32 is extended to the back surface of the insulator substrate 10 via, for example, a through-hole not illustrated. The conductor pattern (broken line) extended to the back surface of the insulator substrate 10 is formed back onto the front surface of the insulator substrate 10 via a through-hole not illustrated which is disposed near the origin of the second quadrant.

The conductor pattern extended to the front surface of the insulator substrate 10 through the through-hole, which is not illustrated, is extended in the −x direction to form one radial portion of the fan shape of the loop antenna 33, disposed in the second quadrant, and then its arc portion and opposite radial portion. Moreover, the terminal of the opposite radial portion of the loop antenna 33 is extended in the +x direction around the origin without contacting other portions of the conductor pattern, to form one radial portion of the loop antenna 34, disposed in the first quadrant, and then its arc portion and opposite radial portion. The terminal of the opposite radial portion of the loop antenna 34 is connected to the feed point 23b.

The direction of current flowing in the arc portion of each loop antenna thus formed is opposite to those in the adjacent loop antennae. Current flows counterclockwise in the arc portion of the loop antenna 31 whereas the directions of currents flowing in the arc portions of the adjacent loop antennae 32 and 33 are clockwise. Also, the direction of current flowing in the arc portion of the loop antenna 32 is clockwise whereas the directions of currents flowing in the arc portions of the adjacent loop antennae 31 and 34 are counterclockwise.

When equal currents are caused to flow in these four adjacently disposed loop antennae 31, 32, 33, 34, not only the sum of the respective magnetic dipole moment vectors m can be zero but also the sum of the magnetic quadrupole moments can be zero, which provides the function of a magnetic octupole. Hence, it is possible to obtain a shaper magnetic field distribution than those of the loop antenna arrays 1 and 2, which have magnetic quadrupole moments.

Fourth Embodiment

Figure 6:
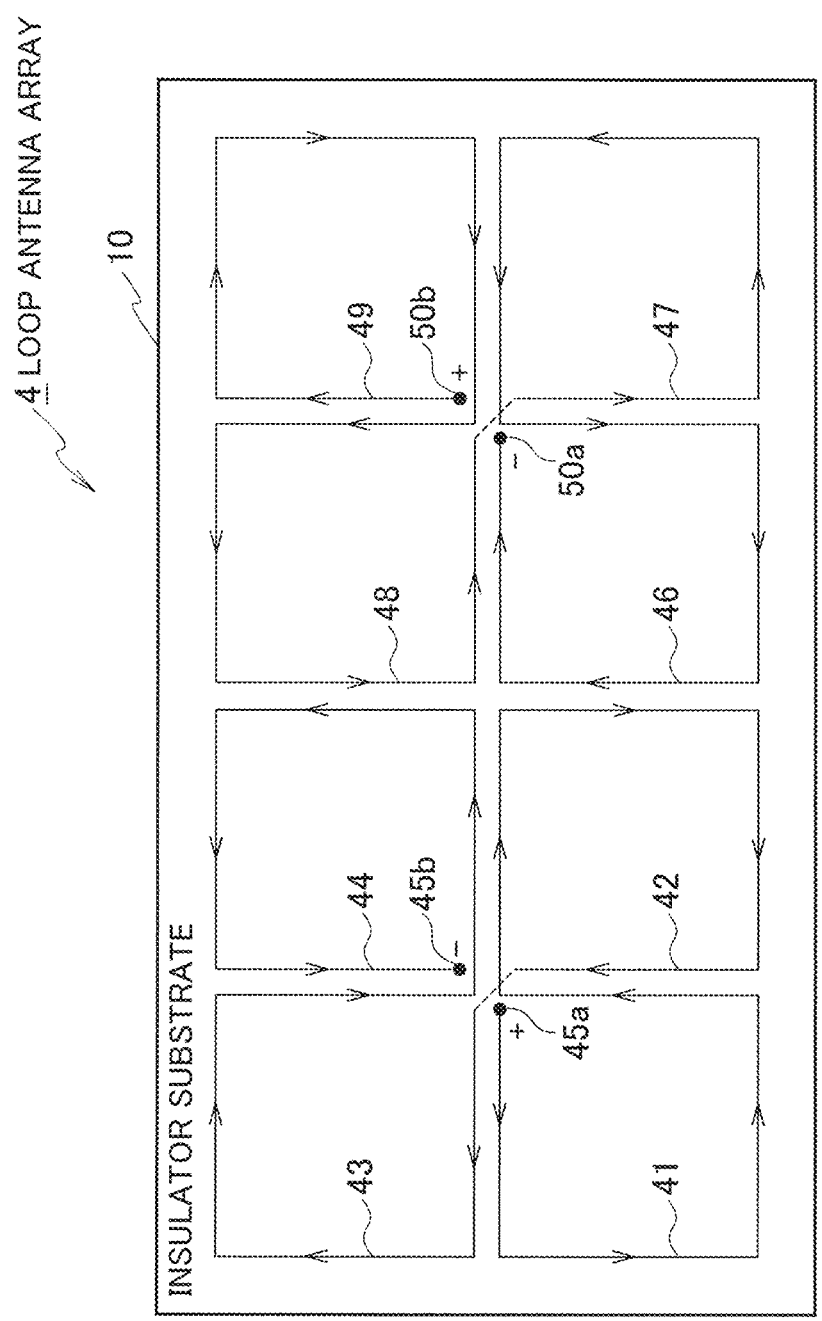
FIG. 6 is a diagram illustrating an exemplary configuration of a loop antenna array 4 in a fourth embodiment.

FIG. 6 illustrates an exemplary configuration of a loop antenna array 4 in a fourth embodiment. In the loop antenna array 4 (loop antenna array group) in this embodiment, eight loop antennae 41 to 49 are disposed on an insulator substrate 10.

In the loop antenna array 4, a plurality of the above-described loop antenna arrays 3 with each antenna formed in a square shape are provided on the insulator substrate 10 (two loop antenna arrays 3 disposed side by side). Specifically, the loop antennae 41, 42, 43, 44, which are energized by a pair of feed points 45a, 45b, generate a magnetic octupole moment. On the other hand, the loop antennae 46, 47, 48, 49, which are energized by another pair of feed points 50a, 50b, generate a magnetic octupole moment vector.

Note that how the pair of feed points 45a, 45b and the loop antennae 41, 42, 43, 44 are connected is the same as the above-described loop antenna array 3 (FIG. 5). Also, how the other pair of feed points 50a, 50b and the loop antennae 46, 47, 48, 49 are connected is the same as the above-described loop antenna array 3 (FIG. 5).

However, in order to make the directions of currents opposite to each other between the adjacent loop antenna arrays with different feed points, the feed points 45a, 45b on one side and the feed points 50a, 50b on the other side have opposite polarities. Specifically, the feed point 45a (+) on the one side and the feed point 50a (−) on the other side, which is situated in the same positional relation as the feed point 45a (+), have opposite polarities. Likewise, the feed point 45b (−) on the one side and the feed point 50b (+) on the other side, which is situated in the same positional relation as the feed point 45b (−), have opposite polarities.

When the polarities of the feed points which are situated in the adjacent loop antenna arrays in the same positional relation are opposed to each other as described above, the directions of currents flowing in the loop antennae situated at the same position in all the adjacent loop antenna arrays (e.g. the loop antenna 43 and the loop antenna 48) can be opposite to each other. Consequently, the sum of the magnetic octupole moments of the loop antenna arrays, which are disposed on the same plane, is zero, which provides the function of a magnetic hexadecapole. Hence, it is possible to obtain a shaper magnetic field distribution than the foregoing embodiments.

Fifth Embodiment

Figure 7:
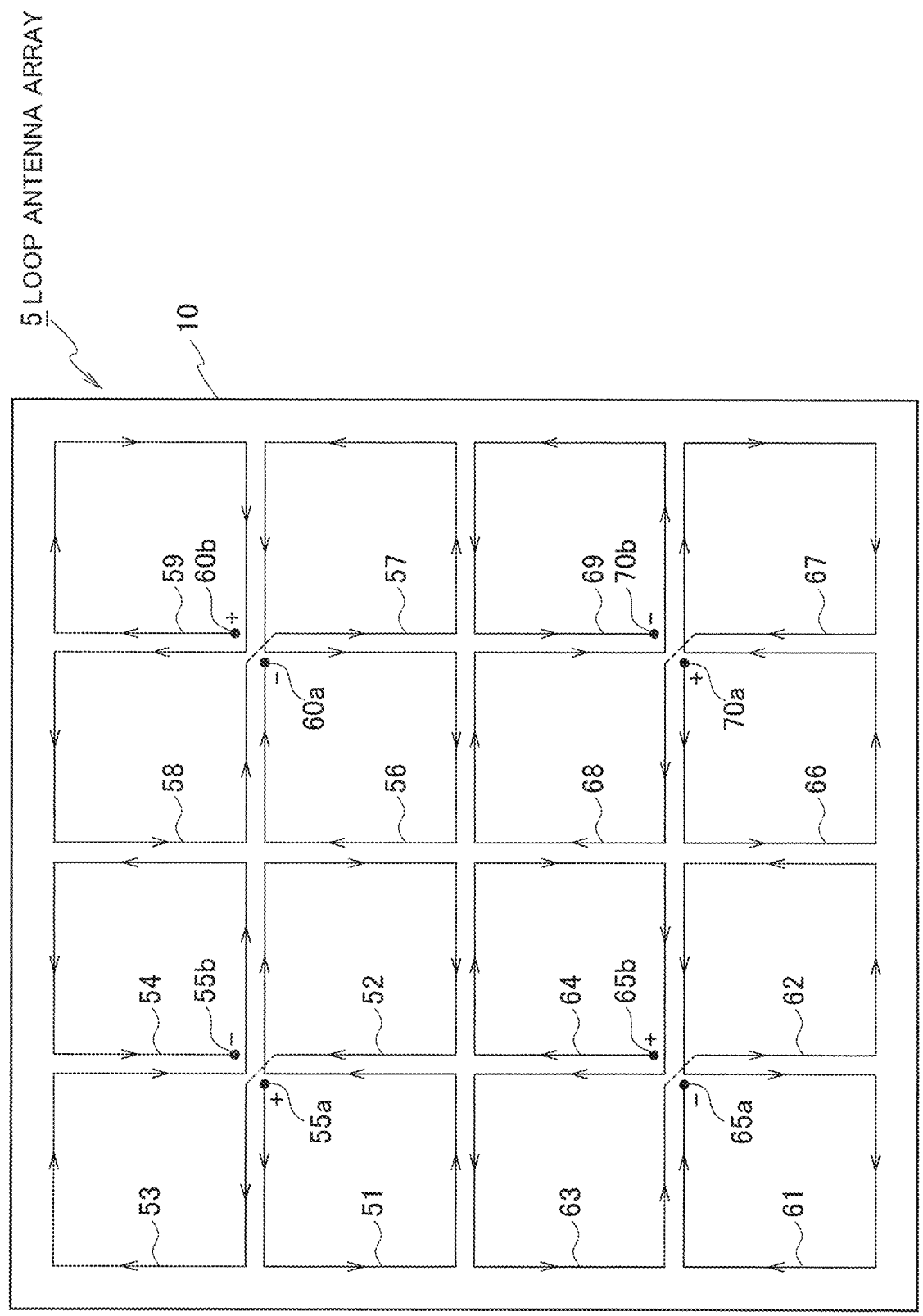
FIG. 7 is a diagram illustrating an exemplary configuration of a loop antenna array 5 in a fifth embodiment.

FIG. 7 illustrates an exemplary configuration of a loop antenna array 5 in a fifth embodiment. In the loop antenna array 5 (loop antenna array group) in this embodiment, two of the above-described loop antenna arrays 4 are disposed side by side in such an orientation that loop antennae constituting these antenna arrays lie adjacently to each other. The loop antenna array 5 includes 16 loop antennae 51 to 67.

Feed points 55a, 55b energize the loop antennae 51, 52, 53, 54. Feed points 60a, 60b energize the loop antennae 56, 57, 58, 59. Feed points 65a, 65b energize the loop antennae 61, 62, 63, 64. Feed points 70a, 70b energize the loop antennae 66, 67, 68, 69. Note that how each set of feed points and the corresponding set of loop antennae are connected is the same as the above-described loop antenna array 3 (FIG. 5).

The feed points situated adjacently to each other in the x-axis direction and the y-axis direction and in the same positional relation have opposite polarities. The feed point 55a (+) and the feed point 60a (−), which is situated adjacently in the x-axis direction to and in the same positional relation as the feed point 55a, have opposite polarities. Likewise, the feed point 55b (−) and the feed point 60b (+), which is situated adjacently in the x-axis direction to and in the same positional relation as the feed point 55b, have opposite polarities.

The feed point 55a (+) and the feed point 65a (−), which is situated adjacently in the y-axis direction to and in the same positional relation as the feed point 55a, have opposite polarities. Likewise, the feed point 55b (−) and the feed point 65b (+), which is situated adjacently in the y-axis direction to and in the same positional relation as the feed point 55b, have opposite polarities.

Similarly, the feed points 70a, 70b and the feed points 65a, 65b, which are situated adjacently in the x-axis direction to and in the same positional relation as the feed points 70a, 70b, have opposite polarities as well. Moreover, the feed points 70a, 70b and the feed points 60a, 60b, which are situated adjacently in the y-axis direction to and in the same positional relation as the feed points 70a, 70b, have opposite polarities.

When the polarities of the feed points which are situated in the adjacent loop antenna arrays in the same positional relation are opposed to each other as described above, the directions of currents flowing in the loop antennae situated at the same position in all the adjacent loop antenna arrays (e.g. the loop antenna 53 and the loop antenna 58, the loop antenna 53 and the loop antenna 63, and the loop antenna 63 and the loop antenna 68) can be opposite to each other. Consequently, the sum of the magnetic hexadecapole moments of the loop antenna arrays, which are disposed on the same plane, is zero, which provides the function of a magnetic 32 pole. Hence, it is possible to obtain a shaper magnetic field distribution than the foregoing embodiments.

[Simulation of Magnetic Field Distribution]

The magnetic field distribution was simulated for the purpose of checking the operation and effect of the present invention. The result of the simulation will be described with reference to FIG. 8 and FIG. 9.

Figure 8A:
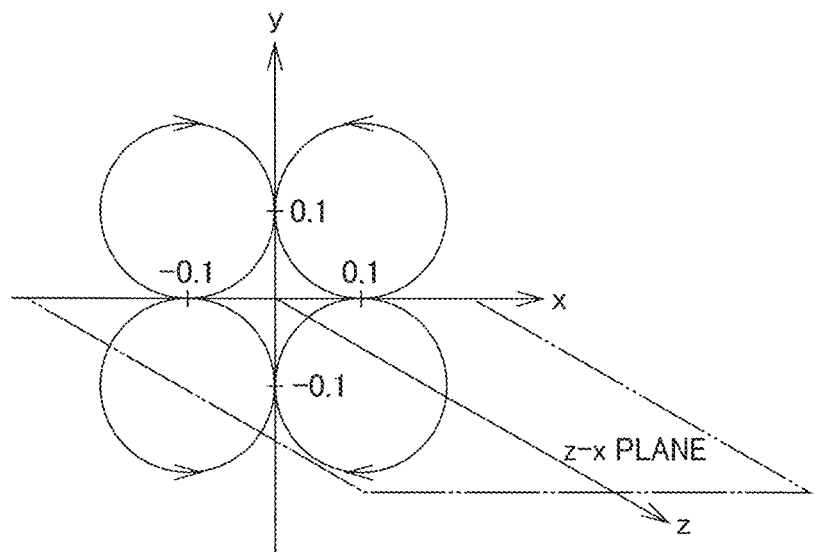
FIGS. 8(a) and 8(b), collectively referred to herein as FIG. 8 are a set of diagrams illustrating conditions of a simulation of a magnetic field distribution, with FIG. 8(a) indicating a z-x plane and FIG. 8(b) indicating a z-w plane.
Figure 8B:
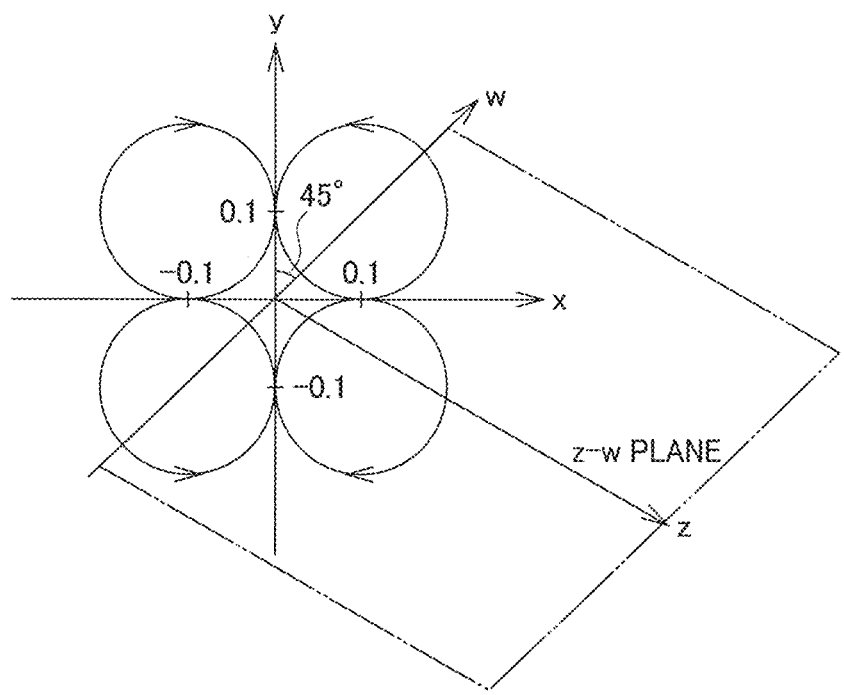

FIG. 8 is a set of diagrams illustrating conditions of the simulation. The magnetic field distribution was simulated with the configuration of the loop antenna array 3, in which four loop antennae were disposed on an insulator substrate 10.

In the loop antenna array, four circular loop antennae 31 to 34 measuring 0.1 m in radius were disposed on the insulator substrate 10. The loop antenna 31 was disposed in the third quadrant of the xy coordinate system, the loop antenna 32 was disposed in the fourth quadrant, the loop antenna 33 was disposed in the second quadrant, and the loop antenna 34 was disposed in the first quadrant. Then, magnetic fields which would be generated upon feeding AC currents of the same phase to the loop antennae were simulated.

Figure 9A:
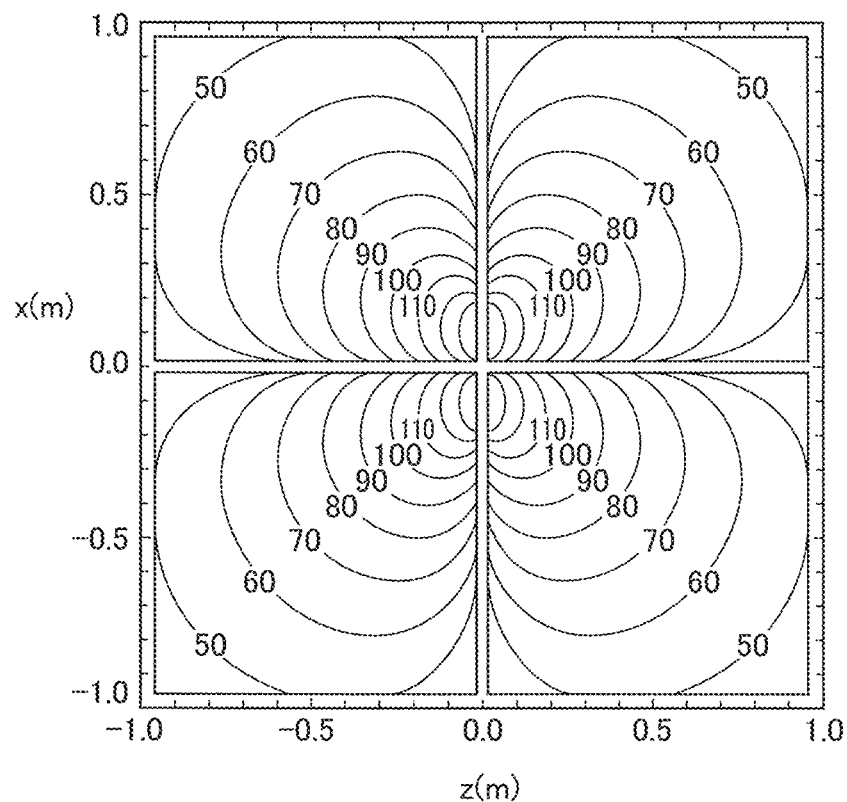
FIGS. 9(a) and 9(b), collectively referred to herein as FIG. 9 are a set of diagrams illustrating the result of the simulation of the magnetic field distribution, with FIG. 9(a) representing the z-x plane and FIG. 9(b) representing the z-w plane.

FIG. 9(a) illustrates the magnetic field distribution in the z-x plane. Magnetic fields are distributed in four directions from the origin. There are zero magnetic fields on the x axis and the y axis. It can be observed that the intensity of the magnetic fields abruptly decreases from the origin. The unit of the numerical values in the figure is dBμA/m, and each single contour line represents a difference of 10 dBμA/m.

The intensity of the magnetic field at the coordinate (0.5, 0.5) is approximately 70 dBμA/m, which is a 70 dB decrease at a position 0.5 m away from the highest-intensity spot near the origin. This amount of attenuation is greater by approximately 20 dB than the amount of attenuation with a conventional single loop antenna.

Figure 9B:
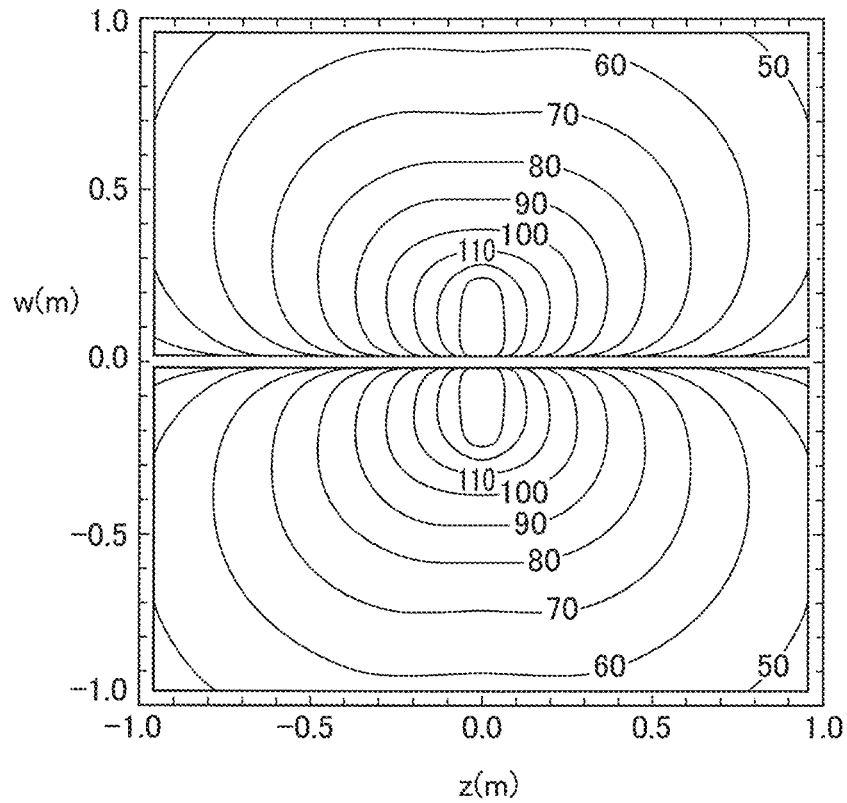

FIG. 9(b) illustrates the magnetic field distribution in the z-w plane. There is a zero magnetic field on the z axis. It can be observed that magnetic fields are distributed in both directions of the z-w plane about the z axis. The intensity of the magnetic field at each position approximately 0.95 m away from the origin in the X direction is approximately 60 dBμA/m. This intensity of the magnetic field represents an amount of attenuation greater by approximately 10 dB than that with a conventional single loop antenna.

As demonstrated above, the loop antenna array of the present invention can create a shape magnetic field distribution that enables the boundary of a communication area to be clearly set.

Note that the loop antenna array in the simulation of the magnetic field distribution is one that makes the sum of magnetic quadrupole moment vectors zero. By further increasing the number of loop antennae, it is possible to implement a loop antenna array that creates a magnetic field distribution with more abrupt attenuation.

In sum, the loop antenna arrays of the above embodiments include $2^n$ loop antennae on an insulator substrate 10, where n is a natural number and represents the number of loop antennae. Moreover, the directions of currents in adjacent ones of the loop antennae are opposite to each other.

Hereinabove, the content of the present invention has been described above through embodiments. However, it is apparent to those skilled in the art that the present invention should not be limited to these descriptions but various modifications and improvements are possible. For example, the shape of the loop antennae may be an elliptical shape. Also, the shape of the insulator substrate 10 is not limited to a rectangle shape.

Also, the magnetic dipole moment vector m has been described based on an example where the number of turns N=1. However, the number of turns N may be increased. The amount of attenuation of the magnetic field can be increased by increasing N. As described above, the present invention is not limited to the above-described embodiments but various modifications are possible without departing from its spirit.

EXPLANATION OF THE REFERENCE NUMERALS 1, 2, 3, 4, 5 loop antenna array
10 insulator substrate
11, 12 loop antenna
13a, 13b feed point
14a, 14b feed point
23a, 23b feed point

The invention claimed is:

1. A loop antenna array group comprising
a first loop antenna array and a second loop antenna array, each of the first loop antenna array and the second loop antenna array comprising $2^n$ loop antennae arranged within an array having $2^n$ positions, wherein the first loop antenna array and the second loop antenna array are adjacent to each other and disposed on a same insulator substrate, where n is a natural number and equals to 2, wherein
the four loop antennae in each of the first loop antenna array and the second loop antenna array are arranged in a two-by-two array comprising two rows and two columns,
directions of currents in two loop antennae that are adjacent in a x-axis direction or a y-axis direction within the array of the first loop antenna array are opposite to each other,
directions of currents in two loop antennae that are adjacent in a x-axis direction or a y-axis direction within the array of the second loop antenna array are opposite to each other, and current flowing in a loop antenna situated at an i-th position in the first loop antenna array has a first direction, and current flowing in a loop antenna situated at the i-th position in the second loop antenna array has a second direction, the first direction and the second direction are opposite to each other, wherein i is an integer number and $1 \leq i \leq 2^n$.

2. The loop antenna array group according to claim 1, wherein a sum of magnetic dipole moment vectors of the $2^n$ loop antennae in each of the first loop antenna array and the second loop antenna array is zero, and each of the magnetic dipole moment vectors is a product of an area surrounded by the corresponding loop antenna and the current therein.

3. The loop antenna array group according to claim 1, wherein all of the loop antennae within the first loop antenna array or the second loop antenna array have a same shape.

4. The loop antenna array group according to claim 2, wherein all of the loop antennae within the first loop antenna array or the second loop antenna array have a same shape.

5. The loop antenna array group according to claim 1, wherein the loop antennae have any of a square shape, a circular shape, a rectangular shape, an elliptical shape, a fan shape, a triangular shape, and a semicircular shape.

6. The loop antenna array group according to claim 2, wherein the loop antennae have any of a square shape, a circular shape, a rectangular shape, an elliptical shape, a fan shape, a triangular shape, and a semicircular shape.

7. The loop antenna array group according to claim 1, wherein all of the loop antennae within the first loop antenna array or the second loop antenna array are energized from a pair of feed points.

8. The loop antenna array group according to claim 2, wherein all of the loop antennae within the first loop antenna array or the second loop antenna array are energized from a pair of feed points.

9. A loop antenna array group comprising a first loop antenna array and a second loop antenna array, each of the first loop antenna array and the second loop antenna array comprising $2^n$ loop antennae arranged within an array having $2^n$ positions and containing more than one row and more than one column, wherein the first loop antenna array and the second loop antenna array are adjacent to each other and disposed on a same insulator substrate, where n is a natural number and is greater than one, wherein directions of currents in two loop antennae that are adjacent in a x-axis direction or a y-axis direction within the array of the first loop antenna array are opposite to each other, directions of currents in two loop antennae that are adjacent in a x-axis direction or a y-axis direction within the array of the second loop antenna array are opposite to each other, and current flowing in a loop antenna situated at an i-th position in the first loop antenna array has a first direction, and current flowing in a loop antenna situated at the i-th position in the second loop antenna array has a second direction, the first direction and the second direction are opposite to each other, wherein i is an integer number and $1 \leq i \leq 2^n$.

10. The loop antenna array group according to claim 9, wherein a sum of magnetic dipole moment vectors of the $2^n$ loop antennae in each of the first loop antenna array and the second loop antenna array is zero, and each of the magnetic dipole moment vectors is a product of an area surrounded by the corresponding loop antenna and the current therein.

11. The loop antenna array group according to claim 9, wherein all of the loop antennae within the first loop antenna array or the second loop antenna array have a same shape.

12. The loop antenna array group according to claim 10, wherein all of the loop antennae within the first loop antenna array or the second loop antenna array have a same shape.

13. The loop antenna array group according to claim 9, wherein the loop antennae have any of a square shape, a circular shape, a rectangular shape, an elliptical shape, a fan shape, a triangular shape, and a semicircular shape.

14. The loop antenna array group according to claim 10, wherein the loop antennae have any of a square shape, a circular shape, a rectangular shape, an elliptical shape, a fan shape, a triangular shape, and a semicircular shape.

15. The loop antenna array group according to claim 9, wherein all of the loop antennae within the first loop antenna array or the second loop antenna array are energized from a pair of feed points.

16. The loop antenna array group according to claim 10, wherein all of the loop antennae within the first loop antenna array or the second loop antenna array are energized from a pair of feed points.

\* \* \* \* \*